United States Patent
Yeh et al.

(10) Patent No.: US 9,424,161 B2
(45) Date of Patent: Aug. 23, 2016

(54) TRACE CAPTURE DEVICE WITH COMMON STRUCTURE AND RELATED TRACE CAPTURE METHOD

(71) Applicant: MEDIATEK INC., Hsin-Chu (TW)

(72) Inventors: Jen-Hao Yeh, Hsinchu (TW);
Chih-Chuan Liang, Hsinchu (TW);
Ming-Yang Chao, Hsinchu County (TW)

(73) Assignee: MEDIATEK INC., Hsin-chu (TW)

( * ) Notice: Subject to any disclaimer, the term of this patent is extended or adjusted under 35 U.S.C. 154(b) by 159 days.

(21) Appl. No.: 14/298,957

(22) Filed: Jun. 8, 2014

(65) Prior Publication Data
US 2015/0355991 A1 Dec. 10, 2015

(51) Int. Cl.
*G06F 11/00* (2006.01)
*G06F 11/34* (2006.01)
*G06F 11/30* (2006.01)

(52) U.S. Cl.
CPC ....... *G06F 11/3466* (2013.01); *G06F 11/3075* (2013.01)

(58) Field of Classification Search
CPC .......................... G06F 11/3466; G06F 11/349
USPC .............................................................. 714/45
See application file for complete search history.

(56) References Cited

U.S. PATENT DOCUMENTS

| | | | | |
|---|---|---|---|---|
| 7,069,176 B2* | 6/2006 | Swaine | ............... | G06F 11/3636 702/176 |
| 7,743,279 B2* | 6/2010 | Walker | ............... | G06F 11/3636 712/227 |
| 8,176,366 B2* | 5/2012 | Horley | ............... | G06F 11/3632 712/227 |
| 2012/0042212 A1* | 2/2012 | Laurenti | ............. | G06F 11/3466 714/45 |
| 2013/0073910 A1* | 3/2013 | Venkumahanti | .... | G06F 11/3656 714/45 |
| 2013/0111274 A1* | 5/2013 | Hopkins | ............. | G06F 11/3656 714/45 |

* cited by examiner

*Primary Examiner* — Joseph Kudirka
(74) *Attorney, Agent, or Firm* — Oblon, McClelland, Maier & Neustadt, L.L.P.

(57) ABSTRACT

A trace capture device includes a processing system, a trace capture control unit and a bus unit. The processing system includes at least one function block arranged to generate first data, second data, and correlation information corresponding to the first data. The trace capture control unit is arranged to receive the first data and correlation information corresponding to the first data from the processing system, and generate third data according to the first data and the correlation information. The bus unit is coupled to the processing system, the trace capture control unit and a data link interface. The bus unit is arranged to use the data link interface to transmit information derived from the second data in a first mode, and reuse the first data link interface to transmit information derived from the third data in a second mode.

24 Claims, 8 Drawing Sheets

TRACE CAPTURE DEVICE WITH COMMON STRUCTURE AND RELATED TRACE CAPTURE METHOD

BACKGROUND

The disclosed embodiments of the present invention relate to a trace capture device, and more particularly, to a trace capture device and a related trace capture method. The trace capture device has a trace capture path sharing a built-in data transmission mechanism, which is capable of aligning and correlating collected trace data.

With developments in the field of electrical engineering, bugs and strange issues which may occur in the electronic devices need to be analyzed and fixed via hardware and software debugging. How to effectively collect enough information for debugging operations is therefore very important. The debugging operations include hardware debugging and software debugging, wherein hardware debugging may be more difficult and require more effort. The software debugging requires configuring a trace capture mechanism in an electronic device, to collect the trace data from the processing system of this electronic device, e.g. monitoring the operations of the processing system. An external debugging device is further utilized to analyze the collected trace information for the hardware and software debugging. However, the signal transmission speed of the trace capture mechanism in the conventional trace capture mechanism is too slow, thus limiting the debugging efficiency of the external debugging device.

Another problem that most debugging engineers might encounter is how to align and correlate different kinds of captured trace data and how to extract useful data for analysis. For example, the procedure of mapping the collected trace data to corresponding hardware engines may be too complex.

Therefore, there is a need to provide a novel trace capture device, which can effectively collect trace data for debugging in order to fix issues in electronic devices.

SUMMARY

One of the objects of the present invention is to provide a trace capture device having a trace data capture path sharing the built-in high-speed bus and a related trace capture method. The trace capture device is used to capture a plurality of trace data, and utilizes a navigation marker to align and correlate the captured trace data according to collected correlation information.

An embodiment of the present invention provides a trace capture device which includes a processing system, a trace capture control unit and a bus unit. The processing system includes at least one function block arranged to generate first data, second data, and correlation information corresponding to the first data. The trace capture control unit is arranged to receive the first data and correlation information corresponding to the first data from the processing system, and generate third data according to the first data and the correlation information. The bus unit is coupled to the processing system, the trace capture control unit and a first data link interface. The bus unit is arranged to use the first data link interface to transmit information derived from the second data in a first mode, and reuse the first data link interface to transmit information derived from the third data in a second mode.

Another embodiment of the present invention provides a trace capture method. The trace capture method includes: receiving first data and second data generated from at least one function block of a processing system and correlation information corresponding to the first data from the processing system; generating third data according to the first data and the correlation information; and using a first data link interface to transmit information derived from the second data in a first mode, and reusing the first data link interface to transmit information derived from the third data in a second mode.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
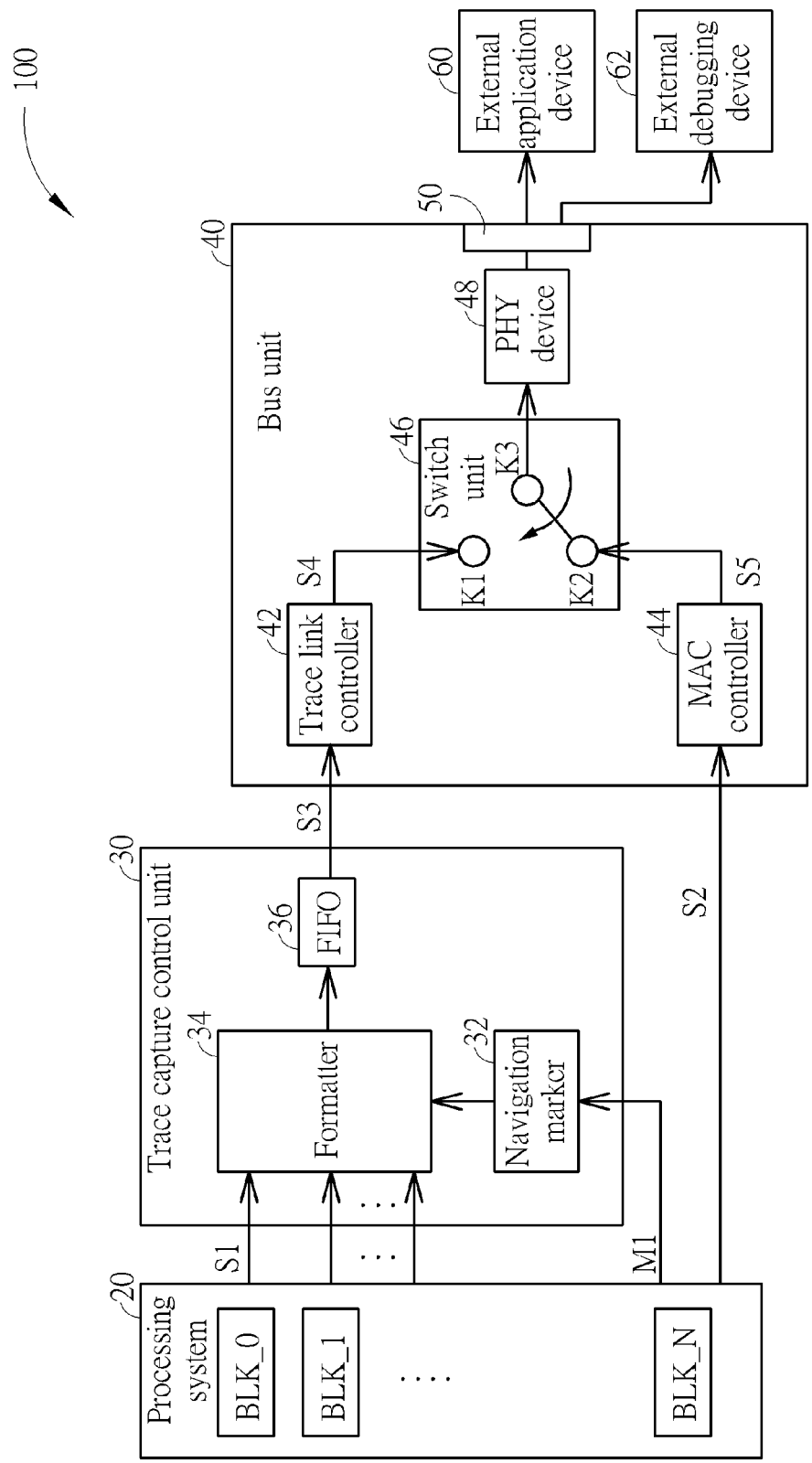
FIG. 1 is a diagram illustrating a trace capture device according to an embodiment of the present invention.

Please refer to FIG. 1, which is a diagram illustrating a trace capture device 100 according to an embodiment of the present invention. As shown in FIG. 1, the trace capture device 100 includes a processing system 20, a trace capture control unit 30 and a bus unit 40. The processing system 20 includes function blocks BLK_0 to BLK_N arranged to generate at least first data S1, second data S2, and correlation information M1 corresponding to the first data S1. However, the present invention is not limited thereto, the processing system 20 may include only one function block. The function blocks BLK_0 to BLK_N may be hardware engines, central processing units (CPUs), modems and/or controllers.

The trace capture control unit 30 is arranged to capture some information of the function blocks BLK_0 to BLK_N for the following debugging operations. The trace capture control unit 30 includes a navigation marker 32, a formatter 34 and a first-in first-out (FIFO) unit 36. The navigation marker 32 is coupled to the processing system 20, and is arranged to receive the correlation information M1 corresponding to the first data S1 from the processing system 20, in order to generate the third data S3 according to the first data S1 and the correlation information M1.

The formatter 34 is coupled to the processing system 20 and the navigation marker 32, and arranged to convert the first data S1 into the third data S3 according to the correlation information M1 received from the navigation marker 32.

Specifically, the correlation information M1 is used to align and correlate the first data S1 received from the processing system 20. For example, the correlation information M1 may include the information relating to locations, operation orders and/or timings of the data extracted from the function blocks BLK_0 to BLK_N. The formatter 34 may extract the useful data (e.g. a portion or all of the first data S1) from the function blocks BLK_0 to BLK_N, and pack the useful data according to the correlation information M1 corresponding to the useful data into a data package. The front part of this data package may include a space arranged for recording the correlation information M1, allowing the data S3 outputted from the trace capture control unit 30 to conform to the transmission specification of the bus unit 40. The data is therefore easy to be analyzed because it has been properly aligned and correlated; hence, the debug engineers may effectively analyze the state of the function blocks BLK_0 to BLK_N.

The FIFO unit 36 is coupled between the formatter 34 and the bus unit 40, and is used as a buffer arranged to slow down the transmission speed of the formatter 34 to the trace link controller 42 of the bus unit 40 in case the processing speed of the bus unit 40 is not fast enough. Please note that the FIFO unit 36 can be optional if the processing speed of the bus unit 40 is sufficiently high.

The bus unit 40 is coupled to the processing system 20, the trace capture control unit 30 and a data link interface 50. The bus unit 40 includes a trace link controller 42, a medium access control (MAC) controller 44, a switch unit 46 and a physical layer (PHY) device 48. The trace link controller 42 is coupled to the trace capture control unit 30, and arranged to convert the third data S3 received from the trace capture control unit 30 into the fourth data S4 conforming to a physical layer (PHY) specification of the data link interface 50.

The MAC controller 44 is coupled to the processing system 20, and arranged to receive the second data S2 from the processing system 20 and convert the second data S2 into fifth data S5. The switch unit 46 is coupled to the trace link controller 42 and the MAC controller 44. The switch unit 46 is arranged to selectively output the fourth data S4 received from the trace link controller 42 or the fifth data S5 received from the MAC controller 44. The PHY device 48 is coupled between an output end of the switch unit 46 and the data link interface 50.

The bus unit 40 is arranged to use the PHY device 48 and the data link interface 50 to transmit information derived from the fifth data S5 in a first mode, and reuse the PHY device 48 and the data link interface 50 to transmit information derived from the fourth data S4 in a second mode. The first mode may be realized as a data transmission mode utilizing a data transmission path, such as a Universal Serial Bus (USB) transmission path. The second mode may be realized as a trace data capture mode which can be enabled when there is a need for capturing the trace data recording the information relating to the states of the function blocks BLK_0 to BLK_N. The first mode can be enabled to transmit data if no debug operation is performed. The switch unit 46 can be used to select an operation mode (e.g., one of the first and second modes) based on the application needs.

The data link interface 50 may be a USB 3.0 interface (e.g., a USB 3.0 port), a Serial Advanced Technology Attachment (SATA) interface, a Peripheral Component Interconnect (PCI) express interface, a High-Definition Multimedia Interface (HDMI) interface, or an Ethernet interface. The output end of the data link interface 50 can be coupled to an external application device 60 (e.g., an external processor or an external storage device) or an external debugging device 62. For example, when the data link interface 50 is coupled to the external debugging device 62 under the second mode, the switch unit 46 is controlled to couple the node K3 to the node K1, in order to output the fourth data S4 received from the trace link controller 42. When the data link interface 50 is coupled to the external application device 60 instead of the external debugging device 62 under the first mode, the switch unit 46 is controlled to couple the node K3 to the node K2, in order to output the fifth data S5 from the MAC controller 44.

The trace data capture path (i.e. the path formed by the trace capture control unit 30, the trace link controller 42, the PHY device 48 and the data link interface 50) shares the built-in high speed data transmission mechanism (i.e. the trace data capture path shares the PHY device 48), so that the trace data capture speed is high enough for the debug engineers to perform debugging instantaneously. The transmission speed of the USB 3.0 can be up to 5 Gbps, and the HDMI is capable of transmitting high definition images. Further, since the aforementioned sharing structure is employed, the layout complexity of the trace capture device 100 may be reduced.

Figure 2:
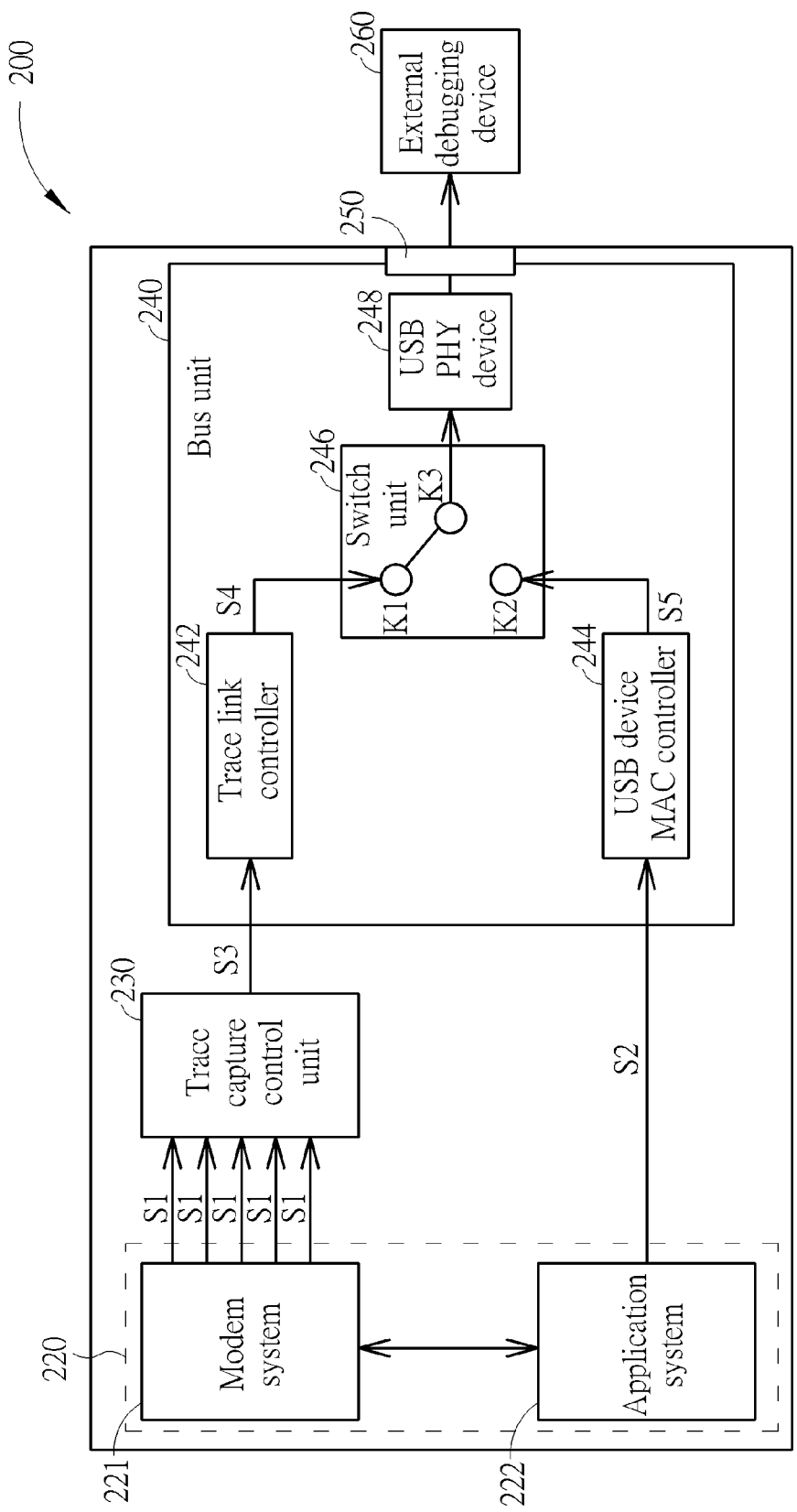
FIGS. 2 and 3 are diagrams illustrating a cellphone according to an embodiment of the present invention.
Figure 3:
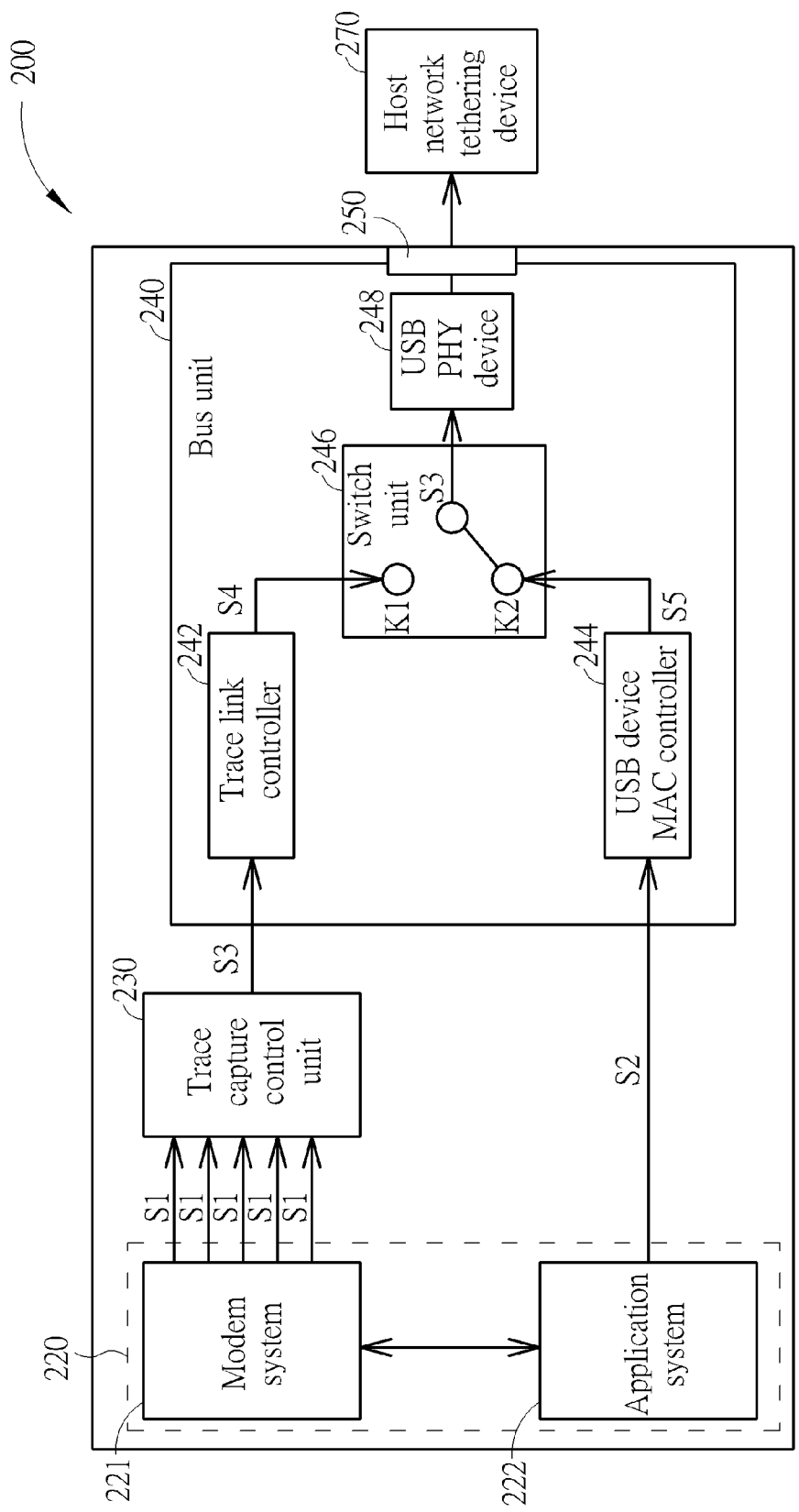

Please refer to FIGS. 2 and 3, which are diagrams illustrating a cellphone 200 according to an embodiment of the present invention. As shown in FIG. 2, a trace capture mechanism similar to the trace capture device 100 shown in FIG. 1 is configured in the cellphone 200. The cellphone 200 includes a processing system 220, a trace capture control unit 230, bus unit 240 and a data link interface 250. The processing system 220 includes a modem system 221 and an application system 222. The modem system 221 includes at least one first function block (not shown) arranged to generate the first data S1, and the application system 222 includes at least one second function block (not shown) arranged to generate the second data S2, and the at least one first function block of the modem system 221 and the at least one second function block of the application system 222 are included in the processing system 220. The at least one first function block of the modem system 221 and the at least one second function block of the application system 222 can be various hardware components as described in the previous embodiment.

The bus unit 240 includes a trace link controller 242, a USB device MAC controller 244, a switch unit 246 and a USB PHY device 248. Please note that the USB device MAC controller 244 and the USB PHY device 248 may be replaced with elements conforming to other transmission specifications, and the present invention is not limited to the USB transmission. The USB device MAC controller 244 is coupled to at least one function block (not shown) of the processing system 220 (i.e. at least one function block of the application system 222), and arranged to generate the fifth data S5.

When the USB PHY device 248 is coupled to an external debugging device 260, the switch unit 246 outputs the fourth data S4 received from the trace link controller 242; and when the USB PHY device 248 is coupled to a host network tethering device 270 as shown in FIG. 3, the switch unit 246 outputs the fifth data S5 from the USB device MAC controller 244. The tethering technique refers to connecting one device to another. In the context of a cellphone (or a tablet), the tethering technique allows sharing the Internet connection of the cellphone with other devices such as a notebook. In this embodiment, the host network tethering device 270 can be a cable arranged for physically connecting a cellphone to a notebook, so that the notebook may surf the Internet through this cellphone with wireless communication ability such as 3rd-generation (3G) or 4th-generation (4G) wireless communications. In another example, the Internet connection of the cellphone 200 can be shared with a notebook through wireless fidelity (WiFi) instead of applying a physical connection.

The trace data capture path (i.e. the path formed by the trace capture control unit 230, the trace link controller 242, the PHY device 248 and the data link interface 250) shares the built-in high speed data transmission mechanism, so that the trace data capture speed is high enough for the debug engineers to perform debugging instantaneously. Further, since the aforementioned sharing structure is employed, the layout complexity of the cellphone 200 may be reduced.

Figure 4:
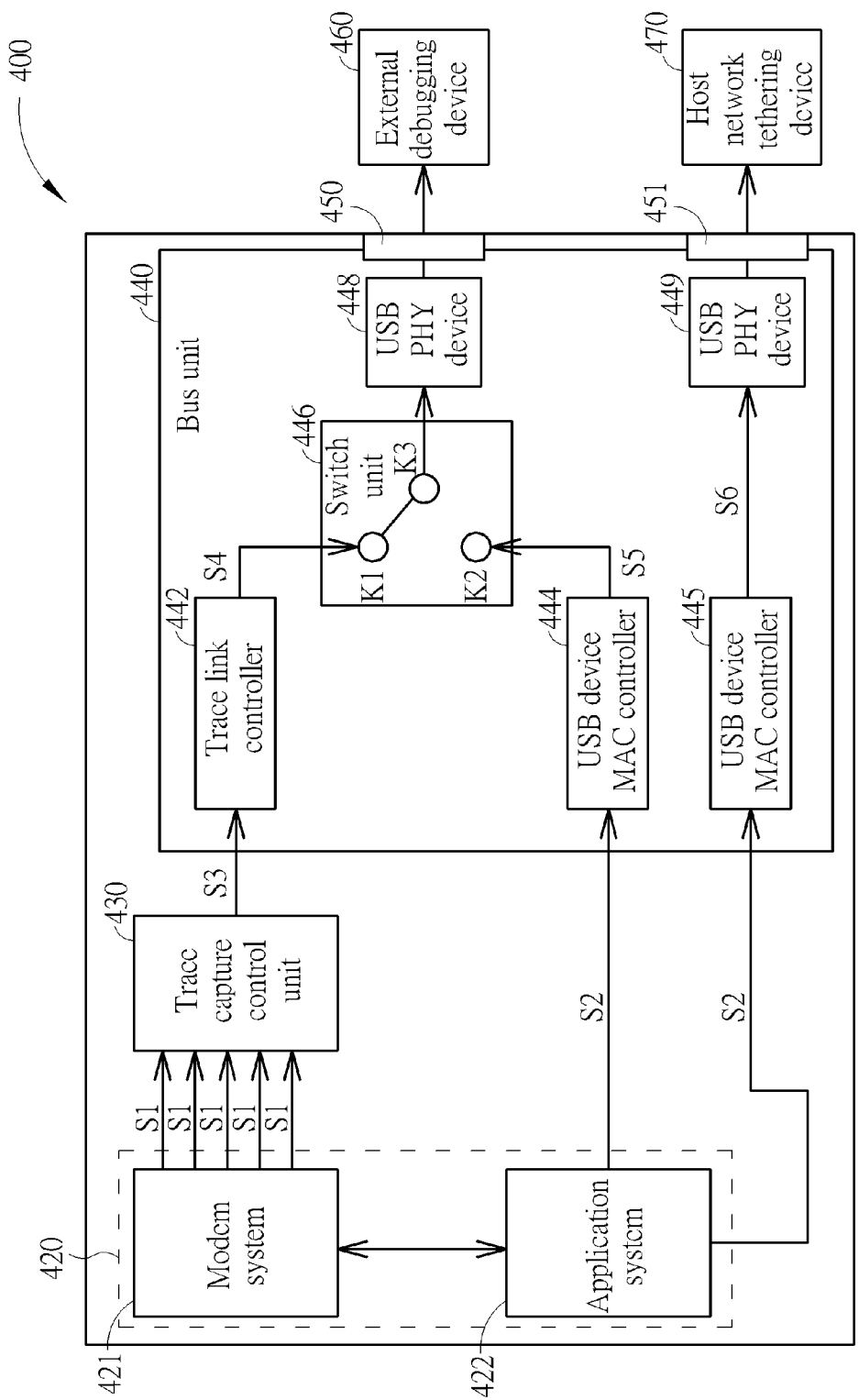
FIGS. 4 and 5 are diagrams illustrating a hotspot device according to an embodiment of the present invention.
Figure 5:
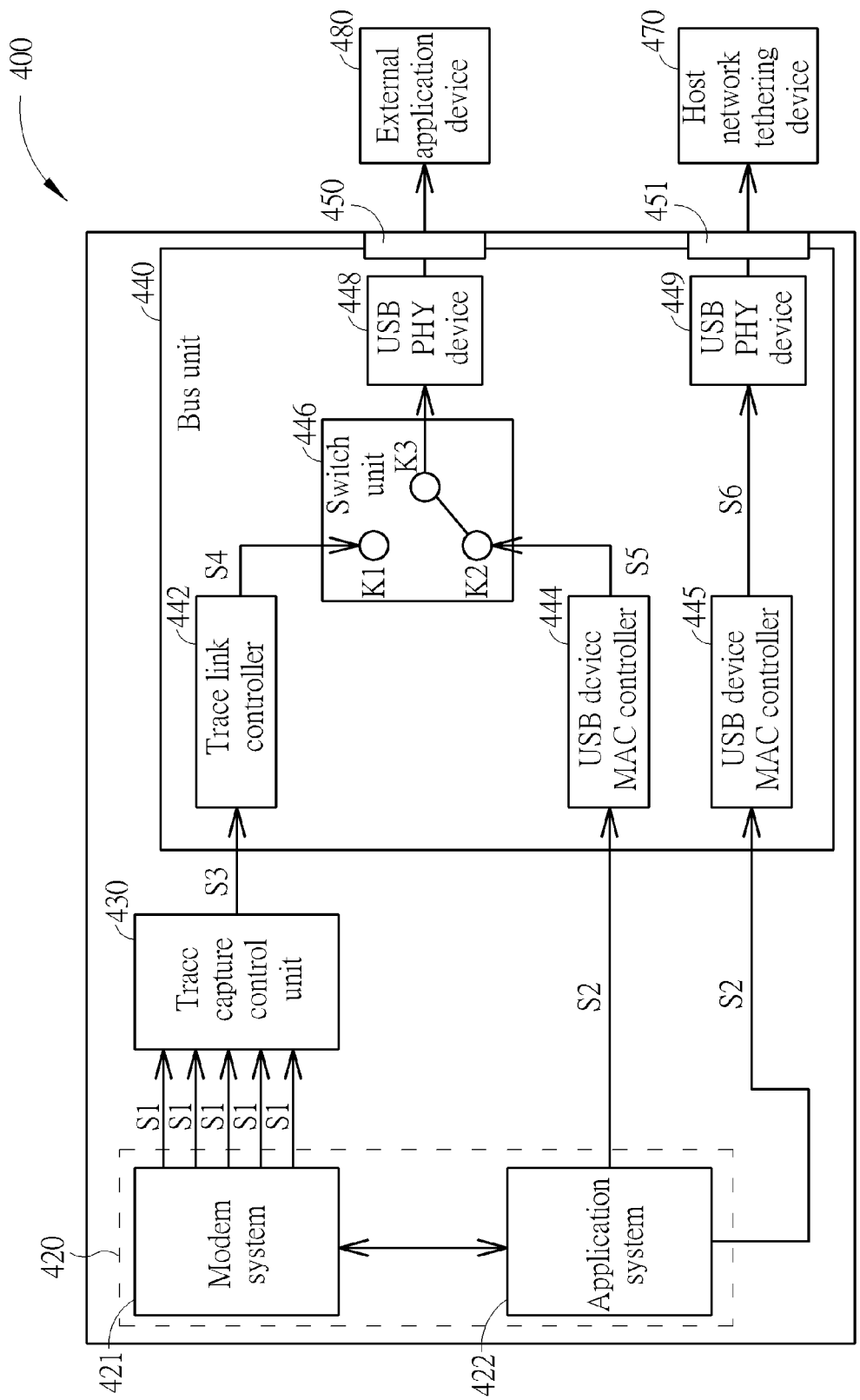

Please refer to FIGS. 4 and 5, which are diagrams illustrating a hotspot device 400 according to an embodiment of the present invention. As shown in FIG. 4, a trace capture mechanism similar to the trace capture device 100 shown in FIG. 1 is configured in the hotspot device 400. The hotspot device 400 includes a processing system 420, a trace capture control unit 430, a bus unit 440 and a data link interfaces 450. Compared with the previous embodiments, the bus unit 440 in this embodiment further includes another USB device MAC controller 445, another USB PHY device 449 and another data link interface 451. The bus unit 440 of the hotspot device 400 has two USB device MAC controllers 444 and 445, two USB PHY devices 448 and 449, and two data link interfaces 450 and 451. Please note that the USB device MAC controllers 444, 445 and the USB PHY devices 448, 449 may be replaced with elements conforming to other transmission specification, and the present invention is not limited to the USB transmission. Further, among the USB device MAC controllers 444, 445, the USB device MAC controller 444 can be the host MAC controller. Similarly, the USB device MAC controller 445 is coupled to at least one function block (not shown) of the processing system 420 (i.e. at least one function block of the application system 422), and arranged to generate the sixth data S6. The USB PHY device 449 is coupled between the USB device MAC controller 445 and the data link interface 451, and the data link interface 451 is coupled to a host network tethering device 470.

The processing system 420 comprises a modem system 421 and an application system 422. Similarly, the modem system 421 includes at least one first function block (not shown), and the application system 422 includes at least one second function block (not shown). The at least one first function block of the modem system 421 and the at least one second function block of the application system 422 can be various hardware components as described in the previous embodiments. The descriptions of features of the hotspot device 400 which are similar to those of the previous embodiments will be omitted here for brevity.

Specifically, when the USB PHY device 448 is coupled to an external debugging device 460 (as shown in FIG. 4), the switch unit 446 outputs the fourth data S4 from the trace link controller 442; and when the USB PHY device 448 is coupled to an external application device 480 (as shown in FIG. 5), the switch unit 446 outputs the fifth data S5 from the USB device MAC controller 444. Please note that, in this embodiment, the external application device 480 can be a wireless transceiver (e.g. a WiFi transceiver) or a memory card reader arranged for reading a memory card such as a SD card or a T-flash card.

The trace data capture path formed by the trace capture control unit 430, the trace link controller 442, the PHY device 448 and the data link interface 450 shares the built-in high speed data transmission mechanism (i.e. sharing the PHY device 448), so that the trace data capture speed is high enough for the debug engineers to perform debugging instantaneously. Further, since the aforementioned sharing structure is employed, the layout complexity of the hotspot device 400 may be reduced. Moreover, the mechanism similar to that configured in the hotspot device 400 can be configured in a router device, so that this router device can have the same advantage of the hotspot device 400. In general, hotspot devices refer to portable devices while router devices refer to stationary devices.

Figure 6:
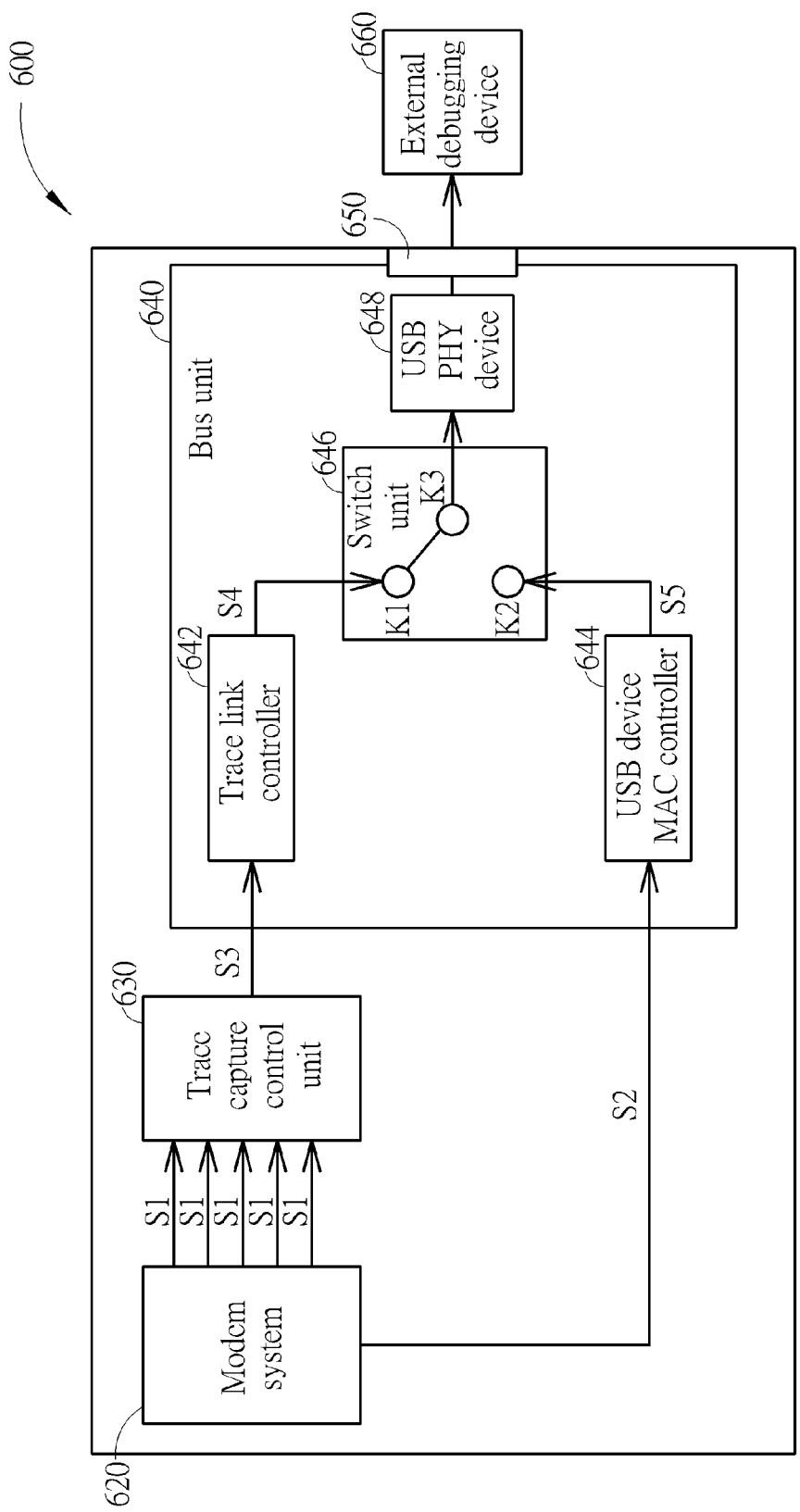
FIGS. 6 and 7 are diagrams illustrating a modem dongle device according to an embodiment of the present invention.
Figure 7:
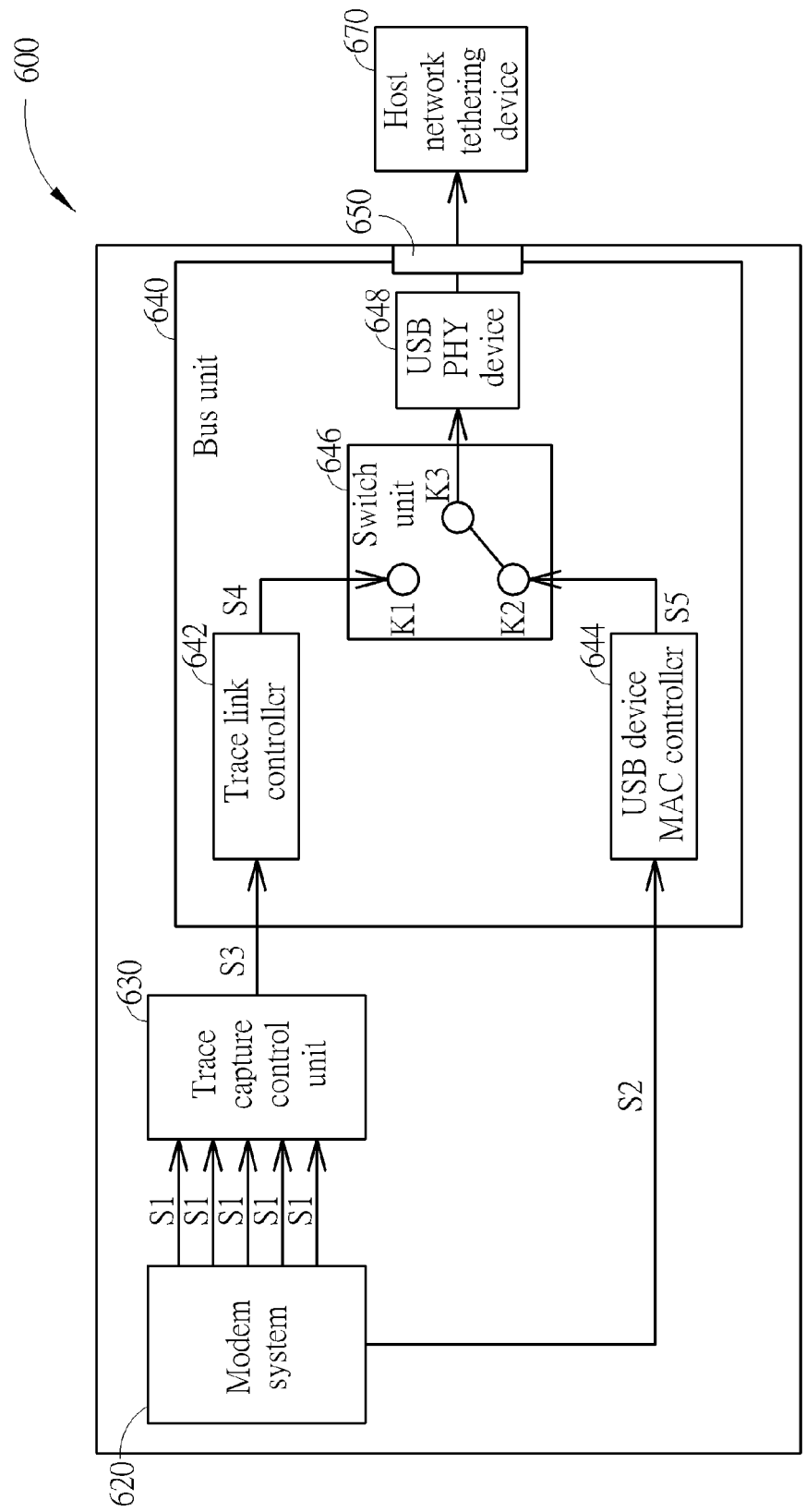

Please refer to FIGS. 6 and 7, which are diagrams illustrating a modem dongle device 600 according to an embodiment of the present invention. As shown in FIG. 6, a trace capture mechanism similar to the trace capture device 100 shown in FIG. 1 is configured in the modem dongle device 600. The modem dongle device 600 includes a modem system 620, a trace capture control unit 630, a bus unit 640 and a data link interface 650. The major difference between the modem dongle device 600 and the cellphone 200 is that the modem dongle device 600 does not have an application system. Further, the elements configured in the modem dongle device 600 may be much fewer and the size of the modem dongle device 600 may be much smaller. For example, the modem dongle device 600 may be implemented as a USB disk for purposes of portability.

When the USB PHY device 648 is coupled to an external debugging device 660, the switch unit 646 outputs the fourth data S4 from the trace link controller 642; and when the USB PHY device 648 is coupled to a host network tethering device 670 (as shown in FIG. 7), the switch unit 646 outputs the fifth data S5 from the USB device MAC controller 644. The descriptions of features of the modem dongle device 600 which are similar to those of the previous embodiments will be omitted here for brevity.

The trace data capture path formed by the trace capture control unit 630, the trace link controller 642, the PHY device 648 and the data link interface 650 shares the built-in high speed data transmission mechanism (i.e. sharing the PHY device 648), so that the trace data capture speed is high enough for the debug engineers to perform debugging instantaneously. Further, since the aforementioned sharing structure is employed, the layout complexity of the modem dongle device 600 may be reduced.

Figure 8:
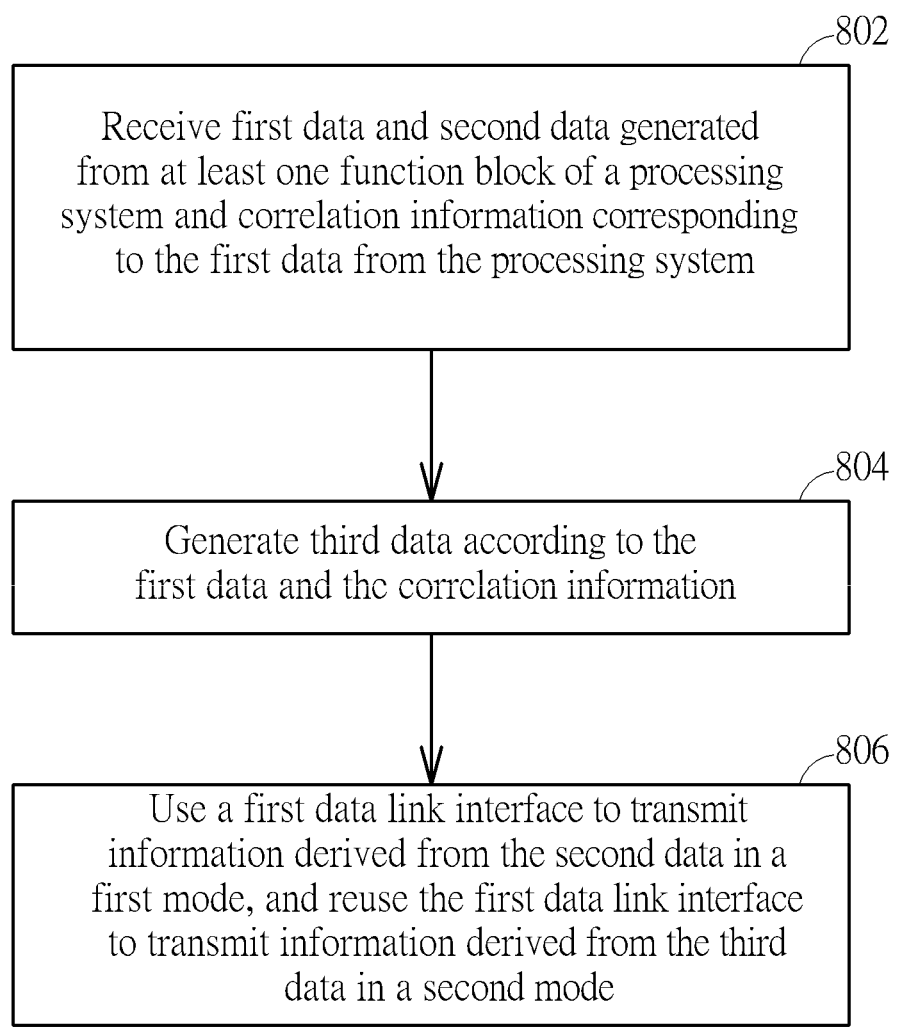
FIG. 8 is a flowchart illustrating a trace capture method according to an embodiment of the present invention.

Please refer to FIG. 8, which is a flowchart illustrating a trace capture method according to an embodiment of the present invention. Provided that the result is substantially the same, the steps are not required to be executed in the exact order shown in FIG. 8. The exemplary method may be employed by the trace capture device 100 shown in FIG. 1, and can be briefly summarized by the following steps.

Step 802: Receive first data and second data generated from at least one function block of a processing system and correlation information corresponding to the first data from the processing system.

Step 804: Generate third data according to the first data and the correlation information.

Step 806: Use a first data link interface to transmit information derived from the second data in a first mode, and reuse the first data link interface to transmit information derived from the third data in a second mode.

As a person skilled in the art can readily understand details of each step shown in FIG. 8 after reading the above paragraphs directed to the trace capture device 100 shown in FIG. 1, further description is omitted here for brevity.

To summarize, the embodiments of the present invention utilize the existing high speed data transmission mechanism of the bus unit in a trace capture device, thus greatly increasing the speed of capturing the trace data. Further, since the sharing structures are employed, the layout complexity of the trace capture device may be reduced. Moreover, the present invention also provides a navigation marker arranged to collect the correlation information corresponding to the plenty of trace data, in order to align and correlate the plenty of trace data for following debugging procedures.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A trace capture device, comprising:
    a processing system, comprising at least one function block arranged to generate first data, second data, and correlation information corresponding to the first data;
    a trace capture control unit, arranged to receive the first data and correlation information corresponding to the first data from the processing system, and generate third data according to the first data and the correlation information; and
    a bus unit, coupled to the processing system, the trace capture control unit, and a first data link interface, the bus unit arranged to use the first data link interface to transmit information derived from the second data in a first mode, and reuse the first data link interface to transmit information derived from the third data in a second mode, wherein the bus unit comprises:
        a trace link controller, coupled to the trace capture control unit, the trace link controller arranged to convert the third data received from the trace capture control unit into fourth data conforming to a physical layer (PHY) specification of the first data link interface;
        a first medium access control (MAC) controller, coupled to the processing system, the first MAC controller arranged to receive the second data from the processing system, and convert the second data into fifth data;
        a switch unit, coupled to the trace link controller and the first MAC controller, the switch unit arranged to selectively output the fourth data from the trace link controller or the fifth data from the first MAC controller; and
        a first PHY device, coupled between an output end of the switch unit and the first data link interface.

2. The trace capture device of claim 1, wherein the trace capture control unit further comprises:
    a navigation marker, coupled to the processing system, the navigation marker arranged to receive the correlation information; and
    a formatter, coupled to the processing system and the navigation marker, the formatter arranged to convert the first data into the third data according to the correlation information received from the navigation marker.

3. The trace capture device of claim 2, wherein the trace capture control unit further comprises:
    a first-in first-out (FIFO) unit, coupled between the formatter and the bus unit.

4. The trace capture device of claim 1, wherein when the first PHY device is coupled to an external debugging device, the switch unit outputs the fourth data from the trace link controller; and when the first PHY device is coupled to a host network tethering device, the switch unit outputs the fifth data from the first MAC controller.

5. The trace capture device of claim 1, wherein the trace capture device is included in a cellphone, the processing system comprising a modem system and an application system, the modem system includes at least one first function block arranged to generate the first data, the application system includes at least one second function block arranged to generate the second data, and the at least one first function block of the modem system and the at least one second function block of the application system are included in the processing system.

6. The trace capture device of claim 1, wherein the trace capture device is included in a modem dongle device which comprises a modem system being the processing system.

7. The trace capture device of claim 1, wherein the bus unit further comprises:
    a second MAC controller, coupled to at least one function block of the processing system, the second MAC controller arranged to generate sixth data; and
    a second PHY device, coupled between the second MAC controller and a second data link interface, wherein the second data link interface is coupled to a host network tethering device.

8. The trace capture device of claim 7, wherein when the first PHY device is coupled to an external debugging device, the switch unit outputs the fourth data from the trace link controller; and when the first PHY device is coupled to an external application device, the switch unit outputs the fifth data from the first MAC controller.

9. The trace capture device of claim 8, wherein the external application device is a wireless transceiver or a memory card reader.

10. The trace capture device of claim 7, wherein the trace capture device is included in a router device.

11. The trace capture device of claim 7, wherein the trace capture device is included in a hotspot device.

12. The trace capture device of claim 1, wherein the first data link interface is a Universal Serial Bus (USB) 3.0 interface, a Serial Advanced Technology Attachment (SATA) interface, a Peripheral Component Interconnect (PCI) express interface, a High-Definition Multimedia Interface (HDMI) interface, or an Ethernet interface.

13. A trace capture method, comprising:
    receiving first data and second data generated from at least one function block of a processing system and correlation information corresponding to the first data from the processing system;
    generating third data according to the first data and the correlation information; and
    using a first data link interface to transmit information derived from the second data in a first mode, and reusing the first data link interface to transmit information derived from the third data in a second mode;
    wherein the step of using the first data link interface to transmit information derived from the second data in the first mode, and reusing the first data link interface to transmit information derived from the third data in the second mode comprises:

converting the third data into fourth data conforming to a physical layer (PHY) specification of the first data link interface;

using a first medium access control (MAC) controller to receive the second data from the processing system, and converting the second data into fifth data; and selectively outputting the fourth data converted from the third data or the fifth data received from the first MAC controller to a first PHY device that is coupled to the first data link interface.

14. The trace capture method of claim 13, wherein the step of generating the third data comprises:

using a formatter to convert the first data into the third data according to the correlation information.

15. The trace capture method of claim 14, wherein the step of generating the third data further comprises:

storing the third data into a first-in first-out (FIFO) unit.

16. The trace capture method of claim 13, wherein when the first PHY device is coupled to an external debugging device, the fourth data is outputted to the first PHY device; and when the first PHY device is coupled to a host network tethering device, the fifth data is outputted to the first PHY device.

17. The trace capture method of claim 13, wherein the trace capture method is employed by a cellphone, the processing system comprises a modem system and an application system, the modem system includes at least one first function block arranged to generate the first data, the application system includes at least one second function block arranged to generate the second data, and the at least one first function block of the modem system and the at least one second function block of the application system are included in the processing system.

18. The trace capture method of claim 13, wherein the trace capture method is employed by a modem dongle device which comprises a modem system being the processing system.

19. The trace capture method of claim 13, further comprising:

coupling a second MAC controller to at least one function block of the processing system, the second MAC controller arranged to generate sixth data; and coupling a second PHY device between the second MAC controller and a second data link interface, wherein the second data link interface is coupled to a host network tethering device.

20. The trace capture method of claim 19, wherein when the first PHY device is coupled to an external debugging device, the fourth data is outputted to the first PHY device; and when the first PHY device is coupled to an external application device, the fifth data is outputted to the first PHY device.

21. The trace capture method of claim 20, wherein the external application device is a wireless transceiver or a memory card reader.

22. The trace capture method of claim 19, wherein the trace capture method is employed by a router device.

23. The trace capture method of claim 19, wherein the trace capture method is employed by a hotspot device.

24. The trace capture method of claim 13, wherein the first data link interface is a Universal Serial Bus (USB) 3.0 interface, a Serial Advanced Technology Attachment (SATA) interface, a Peripheral Component Interconnect (PCI) express interface, a High-Definition Multimedia Interface (HDMI) interface, or an Ethernet interface.

* * * * *